United States Patent [19]

Eising

[11] Patent Number: 4,790,268

[45] Date of Patent: Dec. 13, 1988

[54] SUBMERSIBLE CHAMBER WATER HEATER

[75] Inventor: John P. Eising, Oconomowoc, Wis.

[73] Assignee: A. O. Smith Corporation, Milwaukee, Wis.

[21] Appl. No.: 31,538

[22] Filed: Mar. 30, 1987

Related U.S. Application Data

[62] Division of Ser. No. 701,963, Feb. 14, 1985, Pat. No. 4,685,425.

[51] Int. Cl.[4] ............................................. F22B 5/00
[52] U.S. Cl. ...................................... 122/17; 122/14; 122/44 A; 122/49; 122/136 R; 126/350 R
[58] Field of Search ............... 122/13 R, 14, 17, 44 R, 122/44 A, 49-51, 75, 111, 45, 47, 48, 135 R, 136 R, 149, 155 R, 155 A, 155 F, 182 R, 187, 164, 156, 446, 448 R; 110/185, 186, 188, 189, 206, 207, 147, 162; 126/361, 373, 374, 350 R, 360 R, 360 A; 431/75, 158; 236/15 BD, 15 C, 26 R, 26 A, 26 B, 26 C, 26 D, 32, 33

[56] References Cited

U.S. PATENT DOCUMENTS

| | | | |
|---|---|---|---|
| 1,933,056 | 10/1933 | Hamilton | 122/17 |
| 2,094,908 | 10/1937 | Thrall | 122/14 |
| 2,414,875 | 1/1947 | Horne | 122/17 |
| 2,443,359 | 6/1948 | Newhouse | 122/17 |
| 3,368,531 | 2/1968 | Fehr | 122/136 R |
| 3,485,566 | 12/1969 | Schoppe | 431/158 |
| 3,587,490 | 6/1971 | Martin | 110/162 |
| 4,204,832 | 5/1980 | Miller | 110/162 X |
| 4,533,315 | 8/1985 | Nelson | 431/75 X |
| 4,651,714 | 3/1987 | Granberg | 122/149 |

Primary Examiner—Steven E. Warner
Attorney, Agent, or Firm—Andrus, Sceales, Starke & Sawall

[57] ABSTRACT

A water heater having improved efficiency. The water heater includes a tubular member that is mounted in an opening in the side of the tank and extends generally horizontally across the tank. The tubular member defines a combustion chamber and a fuel burner is located within the combustion chamber. The outer end of the tubular member communicates with the atmosphere and air is drawn into the tubular member and mixed with fuel to provide a mixture which is ignited. The waste gases of combustion are discharged from the inner end of the tubular member into a heat exchanger which is located in the tank beneath the tubular member, and the hot waste gases being discharged from the combustion chamber and passing through the heat exchanger transfer heat to the water in the tank. The heat exchanger is connected to a stack and a blower is mounted in the stack downstream of the heat exchanger and serves to draw the waste gases of combustion from the combustion chamber through the heat exchanger to the stack.

3 Claims, 1 Drawing Sheet

SUBMERSIBLE CHAMBER WATER HEATER

This is a division of application Ser. No. 06/701,963, filed Feb. 14, 1985, now U.S. Pat. No. 4,685,425.

BACKGROUND OF THE INVENTION

In the conventional storage type, gas-fired water heater, a gas burner is located beneath the lower head of the tank and waste gases of combustion from the burner are discharged through one or more vertical flues that extend upwardly through the tank. With this construction, heat is transferred from the burner to the lower head to heat the water in the tank and heat is also transferred to the water from the waste gases passing upwardly through the flues.

In an attempt to increase the efficiency of the water heater, submersible chamber heaters have been developed. With submersible chamber heaters, the burner, instead of being mounted beneath the lower head, is positioned in a closed combustion chamber located within the lower portion of the tank. Waste gases from the combustion process are discharged through a flue which extends upwardly through the tank as disclosed in U.S. Pat. No. 4,301,772, and the gases flowing upwardly within the flue act to transfer additional heat to the water in the tank.

During standby periods when the burner is not in operation, there will be a flow of air by convection through the internal flue with the resultant transfer of heat from the heated water in the tank to the air passing upwardly through the flue, thereby resulting in considerable heat loss during standby periods. Because of this, the conventional water heater using internal flues has an in service efficiency of less than 70%.

There is also a tendency in the conventional water heater utilizing internal flues for the water to statify and be overheated. Heated water will rise to the top of the tank by convection and during periods of short intermittent draws, the heated water in the upper end of the tank may be overheated by heat transfer from the hot flue gases passing through the internal flues. With commercial water heaters, where it is desired to heat water to sanitizing temperatures of 180° F., it is difficult to heat the water to this temperature without overheating and resultant actuation of the temperature-pressure relief valve.

SUMMARY OF THE INVENTION

The invention is directed to a submersible chamber water heater having improved efficiency. In accordance with the invention, the heating unit comprises a generally horizontal tubular member that is mounted in an opening in the side wall of the tank and extends across the lower portion of the tank in contact with the water to be heated. The tubular member defines a combustion chamber and a gas burner is mounted in the combustion chamber. The burner is preferably an open-ended gas pipe and gas is supplied to the pipe through a conventional gas valve.

The outer end of the tubular member communicates with the atmosphere and air is drawn into the tubular member by an aspirating action created by the gas being discharged from the outlet of the gas pipe. The resultant mixture of air and fuel gas is ignited, preferably by a pilot light, and heat from the combustion process is transferred through the tubular member to the water in the lower portion of the tank.

The waste gases of combustion flow downwardly from the inner end of the combustion chamber and are directed into a heat exchanger located beneath the tubular member. Additional heat from the waste gases flowing through the heat exchanger are transferred to the water in the lower portion of the tank.

The outer end of the heat exchanger is connected to a stack or flue and a blower is located in the flue, downstream of the heat exchanger. The blower operates to induce a flow of the waste gases from the combustion chamber through the heat exchanger to the stack.

When the thermostat in the tank calls for heat, the gas valve is opened to supply gas to the burner and the gas flow aspirates air into the combustion chamber, and the air is mixed with the gas and the mixture ignited by the pilot light. The gas pressure resulting from the opening of the gas valve actuates the pressure switch which acts to operate the blower which then induces the flow of waste gases through the heat exchanger to the atmosphere.

A mechanism is also provided for introducing air into the waste gases at a location upstream of the blower to cool the gases. This mechanism may take the form of an orifice communicating with the flue which causes air to be drawn by an aspirating action into the flue to cool the waste gases of combustion.

The invention provides improved efficiency for the water heating operation. As there are no internal flues, standby heat loss is reduced, thereby resulting in a substantially improved in-service efficiency.

The elimination of internal flues also virtually eliminates stacking or stratification of water in the tank and this allows a single temperature control to be used for the water heater.

As the burner and heat exchanger are an integral unit, the unit can be readily disassembled from the tank for maintenance or repair or for the removal of lime buildup or other sediment from the bottom of the tank.

Because combustion is confined to the closed combustion chamber, the water heater has improved safety.

Other objects and advantages will appear in the course of the following description.

DESCRIPTION OF THE DRAWINGS

The drawings illustrate the best mode presently contemplated of carrying out the invention.

In the drawings.

DESCRIPTION OF THE PREFERRED EMBODIMENT

Figure 1:
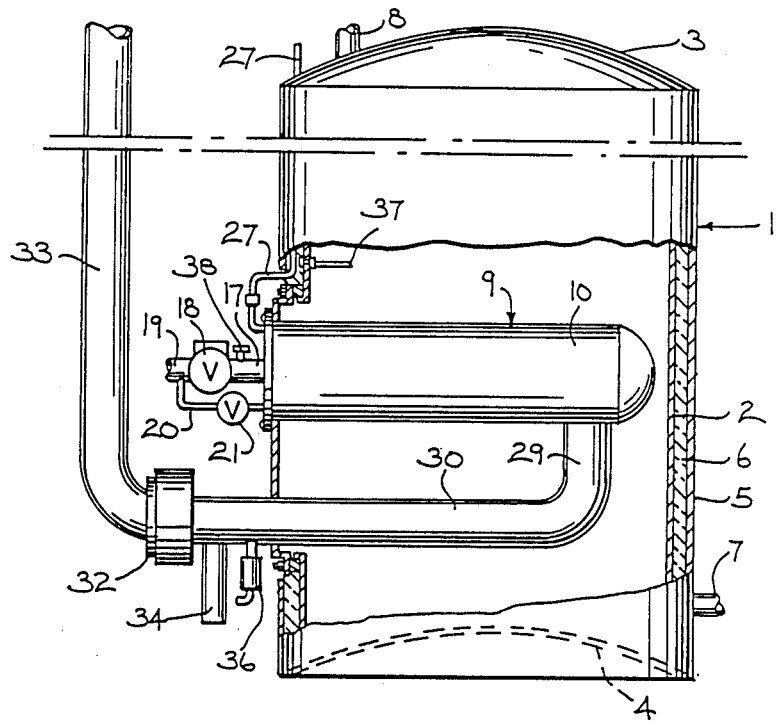
FIG. 1 is a side elevation of a water heater incorporating a heater unit of the invention with parts broken away in section.

FIG. 1 shows a water heater 1 composed of a generally cylindrical tank 2 which is enclosed by a dome shaped upper head and a dome-shaped lower head 4. The cylindrical tank 2, as well as the heads 3 and 4, are preferably constructed of a corrosion resistant material, such as glass coated steel.

An outer jacket 5 is spaced outwardly from the tank 2 and upper head 3 and a layer of insulating material 6, which can be a fibrous or foam type insulation, is positioned between jacket 5 and tank 2 and head 3.

Cold water to be heated is introduced into the lower portion of tank 2 through an inlet nipple 7, while heated water is withdrawn from the upper end of the tank through an outlet pipe 8.

Water in the tank is heated by a heating unit indicated generally by 9 which is mounted in an opening in the cylindrical tank 2 and is spaced above lower head 4.

Heating unit 9 includes a closed tubular member 10 which extends horizontally across the lower portion of tank 2 and defines a combustion chamber 11. The outer end of the tubular member 10 is enclosed by an end plate 12 and the peripheral edge portion 13 of end plate 12 is secured by screws to a mounting ring 14. Mounting ring 14, in turn, is connected to a reinforcing ring 15, that borders an opening in tank 2, by a series of studs 16.

Figure 2:
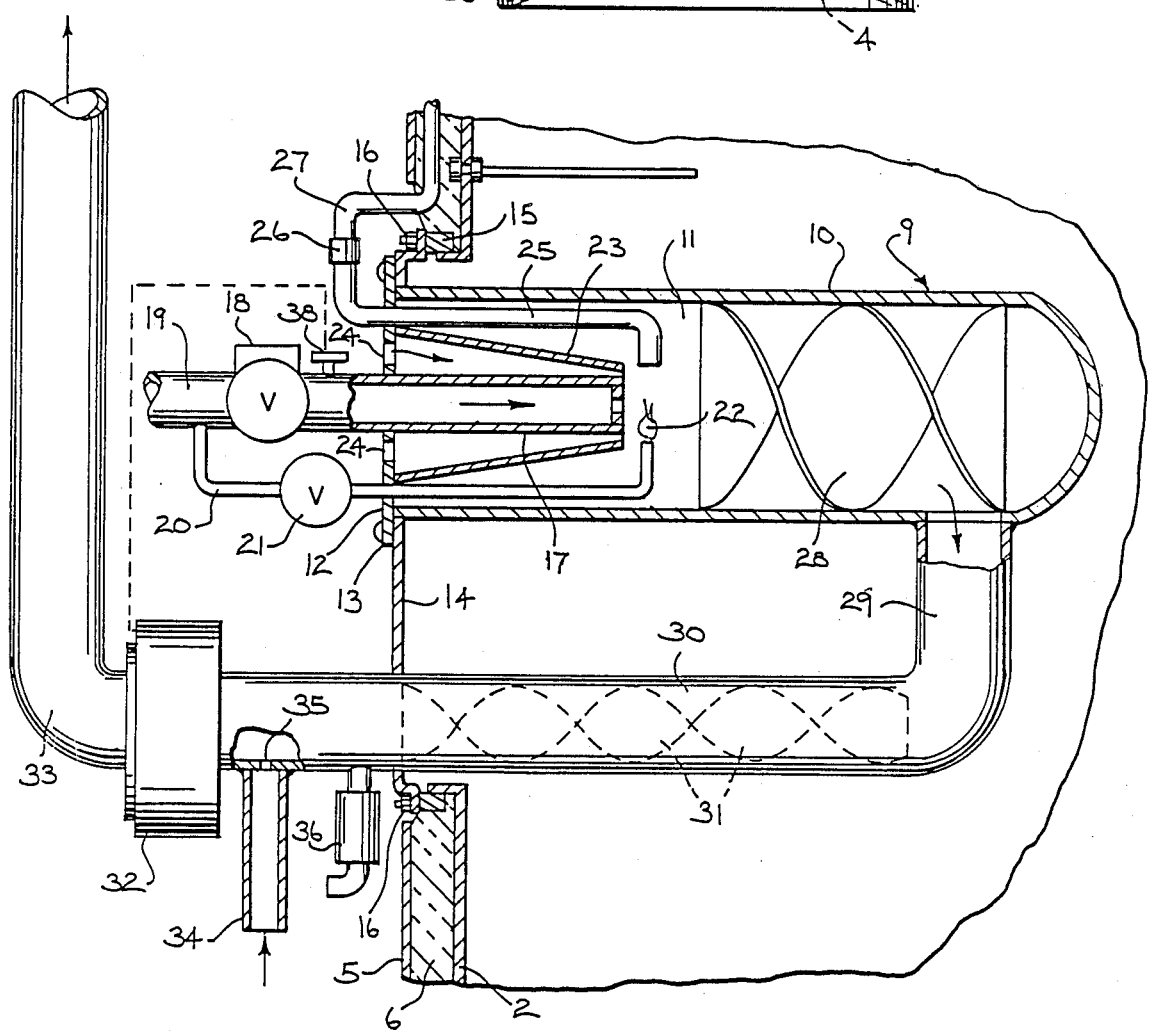
FIG. 2 is an enlarged vertical section of the heating unit.

As shown in FIG. 2, a gas burner 17, which takes the form of an open-ended pipe is located within combustion chamber 11 and burner 17 is connected through a conventional gas valve 18 to the gas supply line 19. In addition, a pilot gas line 20 is connected to the gas line 19 upstream of gas valve 18 and a conventional pilot valve 21 is mounted in line 20. The inner end of line 20 terminates adjacent the end of the burner 17 and gas flowing from the end of the line 19 is ignited to provide a pilot light indicated by 22.

Located within tubular member 10 is a conical member 23 which defines a venturi. A plurality of holes 24 are formed in end plate 12 and communicate with the larger diameter end of conical member 23. With this construction, gas flowing from the inner end of burner 17 will create an aspirating effect to draw air through holes 24 into the venturi. The mixture of air and fuel gas is then ignited by the pilot light 22.

To vent the gases generated by combustion of the gas in the pilot light during standby periods of the water heater, a vent tube 25 is mounted in combustion chamber 11. As shown in FIG. 2, the inner end of vent tube 25 is located above the pilot light 22 and tube 25 extends outwardly through an opening in end plate 12 and is connected through coupling 26 to a tube 27. Tube 27 passes upwardly through the space between jacket 5 and tank 2 and the upper end of tube 27 projects upwardly from the water heater, as shown in FIG. 1. During standby periods, the waste gases generated by burning of the pilot gas will be drawn upwardly by convection through the tubes 25 and 27 and discharged to the atmosphere.

To increase the heat transfer to the water in tank 2, baffles 28 can be mounted in the inner end of the tubular member 10. Baffles 28 will increase the turbulence of the waste gases of combustion, as well as increasing the residence time of the gases in the combustion chamber, to thereby increase the rate of heat transfer to the water.

Extending downwardly from the inner end of tubular member 10 is a conduit 29 which communicates with a heat exchanger 30 mounted beneath tubular member 10. Heat exchanger 30 can also contain a series of baffles 31. The waste gases of combustion flow downwardly from the combustion chamber 11 through conduit 29 and through heat exchanger 30 to thereby transfer additional heat to the water in tank 2.

As shown in FIG. 2, the outer end of heat exchanger 30 extends outwardly through an opening in mounting ring 14 and is connected to the suction side of a blower 32. The outlet or discharge side of blower 32 is connected to flue 33. Operation of blower 32 induces a draft in combustion chamber 11 and heat exchanger 30 to draw the waste gases of combustion through the heat exchanger for discharge to the atmosphere.

The invention also includes a mechanism for diluting the waste gases of combustion with air to reduce the temperature of the gas prior to the gas being drawn to blower 32. In this regard, a tube 34 communicates with the outer end of heat exchanger tube 30 and an orifice 35 provides communication between tube 34 and heat exchanger tube 30. The flow of gas through the heat exchanger 30 will create an aspirating action to draw air from the atmosphere through tube 34 to thereby cool the gas before it is drawn to blower 32.

Cooling of the waste gases of combustion in the heat exchanger 30 can generate a substantial quantity of condensation and the latent heat of vaporization will be transferred to the water in the tank to further increase the efficiency of the operation. To drain condensate from the heat exchanger 30 a condensate trap 36 is mounted within an opening in the tube 40 and is located outward of the tank 1. Condensate trap 36 can be constructed in the manner shown in co-pending U.S. Pat. No. 4,627,460. The condensate trap operates to drain condensate, while preventing the waste gases of combustion from passing through the trap to the atmosphere.

A conventional thermostat 37 is mounted in tank 2 above the heating unit 9. When the temperature of the water in tank 2 falls beneath the setting of thermostat 37, the thermostat operates to open gas valve 19 to permit gas to flow to the burner 17. The flow of gas causes air to be drawn to the burner through the holes 24 by an aspirating action and the mixture of gas and air is ignited by the pilot light 22.

When thermostat 37 acts to open gas valve 19, the flow of gas into burner 17 will actuate a pressure switch 38 which acts to operate blower 32. Operation of the blower will then induce a flow of the waste gases of combustion through the heat exchanger 30 and discharge the gases through the flue 33. The flow of gas within the heat exchanger tube 30 will cause air to be drawn into the tube through an aspirating action to mix with and cool the waste gases of combustion.

The submersible chamber heating unit 9, along with the heat exchanger 30, substantially improves the efficiency of the water heating operation.

As interior flues are eliminated, there is no heat loss to air moving upwardly to the flues by convection during standby periods and this further improves the overall efficiency of the heater.

The elimination of the interior flue also prevents stratification and overheating of the water in the upper end of the tank and thereby enables the water heater to be operated with a single temperature control.

Because the heating unit 9 is located in the tank 1, rather than being positioned beneath the bottom head 4, the buildup of scale on the bottom head, in locations having a high lime content in the water, will not effect the efficiency of the heating unit.

Various modes of carrying out the invention are contemplated as being within the scope of the following claims particulary pointing out and distinctly claiming the subject matter which is regarded as the invention.

I claim:

1. A high efficiency water heating apparatus, comprising a tank to contain water to be heated, means for withdrawing heated water from the upper end of the tank, heating means for heating water in the tank and comprising a tubular member disposed in an opening in the side wall of the tank and extending across said tank, a burner disposed within the tubular member, gas supply means for supplying a combustible gas fuel to said burner, means for supplying air to the burner to provide a combustible fuel-air mixture, pilot light means for igniting said mixture and generating waste gases of combustion, a heat exchanger located beneath the tubular member, conduit means for conducting waste gases from the tubular member to the heat exchanger, a flue communicating with the heat exchanger, a blower disposed in the flue and located downstream of said heat exchanger, whereby operation of said blower will draw said gases from said tubular member through said heat exchanger and discharge said gases to the atmosphere, a gas valve disposed in said gas supply means for controlling the flow of gas to the burner, temperature sensing means responsive to a preset temperature of the water in said tank and operably connected to said gas valve for operating said gas valve and admitting gas to the burner when the temperature of the water falls below said preset temperature, flow sensing means for sensing the flow of gas to said burner and operating said blower, and a vent tube, one end of said vent tube being disposed adjacent said pilot light means and the other end of said vent tube being disposed outside of said tubular member and communicating with the atmosphere, said vent tube serving to vent gases generated by burning of said pilot light means.

2. A high efficiency water heating apparatus, comprising a tank to contain water to be heated, means for withdrawing heated water from the upper end of the tank, heating means for heating water in the tank and comprising a tubular member disposed in said tank and defining a submerged combustion chamber, a burner disposed within the tubular member, gas supply means for supplying a combustible gas fuel to said burner, said tubular member having an opening communicating with the atmosphere, said opening comprising means for supplying air to the burner to provide a combustible fuel-air mixture, igniting means for igniting said mixture and generating waste gases of combustion, a heat exchanger disposed in the tank, conduit means for conducting waste gases from the tubular member to the heat exchanger, a stack communicating with the heat exchanger, blower means for flowing said waste gases from said combustion chamber and through said heat exchanger to said stack, flow sensing means for sensing the flow of gas to said burner and operating said blower means, and a venturi disposed concentrically outward of said burner, said venturi having a large diameter end communicating with said opening and a small diameter end disposed adjacent the outlet of said burner.

3. The apparatus of claim 2, wherein said blower means is disposed in said stack and located downstream of said heat exchanger.

* * * * *